(12) United States Patent
Cheng et al.

(10) Patent No.: US 10,209,427 B2
(45) Date of Patent: Feb. 19, 2019

(54) ELECTRONIC DEVICE

(71) Applicant: ALSON TECHNOLOGY LIMITED, Kowloon (HK)

(72) Inventors: Han-Hung Cheng, Zhubei (TW); Wei-Di Cheng, Zhubei (TW)

(73) Assignee: ALSON TECHNOLOGY LIMITED, Kowloon (HK)

( * ) Notice: Subject to any disclaimer, the term of this patent is extended or adjusted under 35 U.S.C. 154(b) by 480 days.

(21) Appl. No.: 14/928,710

(22) Filed: Oct. 30, 2015

(65) Prior Publication Data

US 2017/0123135 A1 May 4, 2017

(51) Int. Cl.
*G06F 13/40* (2006.01)
*F21V 8/00* (2006.01)

(52) U.S. Cl.
CPC ......... *G02B 6/0041* (2013.01); *G02B 6/0083* (2013.01)

(58) Field of Classification Search
CPC ............................ G02B 6/0041; G02B 6/0043
See application file for complete search history.

(56) References Cited

U.S. PATENT DOCUMENTS

| | | | | |
|---|---|---|---|---|
| 6,186,633 B1* | 2/2001 | Zen | ......................... | B60K 37/02 116/286 |
| 8,851,985 B2* | 10/2014 | Rasmussen | ......... | G07F 17/3211 463/20 |
| 2013/0322081 A1* | 12/2013 | Pan | ..................... | H01L 25/0753 362/249.02 |

FOREIGN PATENT DOCUMENTS

TW          M508053          9/2015

* cited by examiner

*Primary Examiner* — Anabel Ton
(74) *Attorney, Agent, or Firm* — Muncy, Geissler, Olds & Lowe, P.C.

(57) ABSTRACT

An electronic device is provided, including a main body and a PCI-E insert row. The main body has a substrate, a light-emitting module and a light-guiding portion. The light-emitting module has a carrier board and a light-emitting portion disposed on the carrier board, the light-guiding portion is arranged corresponding to the light-emitting portion, and at least a part of light from the light-emitting portion is projected to outside of the electronic device through the light-guiding portion. The PCI-E insert row is disposed on the substrate, and the PCI-E insert row is for being electrically connected with the PCI-E insert slot.

9 Claims, 5 Drawing Sheets

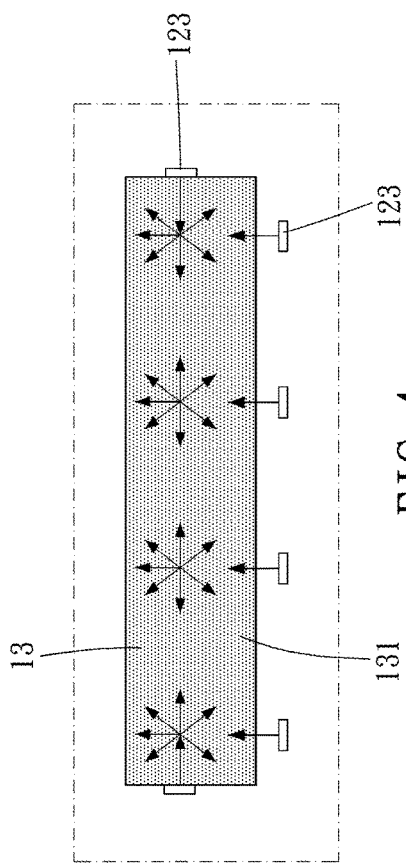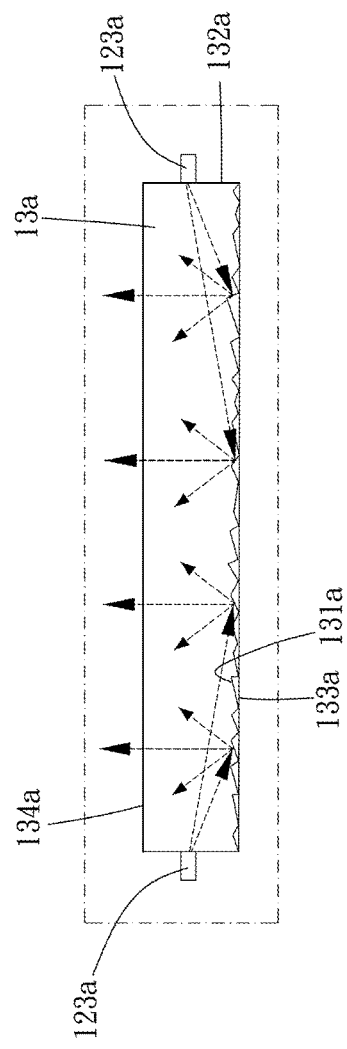

ELECTRONIC DEVICE

BACKGROUND OF THE INVENTION

Field of the Invention

The present invention relates to an electronic device.

Description of the Prior Art

An electronic device as disclosed in TWM508053 includes a substrate, at least one light-emitting diode and one light-penetrable light-guiding body. The substrate has a PCI-E insert row, and the PCI-E insert row is for being electrically inserted into a PCI-E insert slot. The at least one light-emitting diode is disposed on a side of the substrate opposite to the insert row and electrically connected with the insert row. The light-penetrable light-guiding body at least covers the at least one light-emitting diode.

However, in this type of electronic device, the light-emitting portion (LED) and the substrate are integrally connected; therefore, if the light-emitting portion is damaged, the substrate and the memory module need to be replaced together, which is money-consuming and resource-wasting.

In addition, when a heat-dissipating efficiency of the light-emitting portion is too low, the substrate may be too hot and damaged, and the whole set of electronic device may need to be replaced.

Besides, the light-guiding portion cannot effectively make the light emitted be distributed evenly, so the electronic device cannot emit light evenly and is less pleasant to the eye.

The present invention has arisen to mitigate and/or obviate the afore-described disadvantages.

SUMMARY OF THE INVENTION

The major object of the present invention is to provide an electronic device in which a substrate and a light-emitting portion are separately arranged, so when the light-emitting portion is damaged, a user only needs to replace a carrier board having the light-emitting portion instead of replacing a whole set of the electronic device.

In addition, the light-emitting portion is disposed on the carrier board instead of sharing a heat-dissipating area with the substrate; therefore, a heat-dissipating efficiency is elevated, and a risk of the electronic device being damaged due to overheating is lowered.

Moreover, a scattering structure of the light-guiding portion makes the light projected from the light-emitting portion scatter to outside of the electronic device more evenly, and the light looks softer.

To achieve the above and other objects, an electronic device is provided, including a main body and a Peripheral Component Interconnect Express (PCI Express, PCI-E) insert row. The main body has a substrate, a light-emitting module and a light-guiding portion, the light-emitting module has a carrier board and a light-emitting portion disposed on the carrier board, the light-guiding portion is arranged corresponding to the light-emitting portion, and at least a part of light from the light-emitting portion is projected to the outside of the electronic device through the light-guiding portion. The PCI-E insert row is disposed on the substrate, and the PCI-E insert row is for being electrically connected with a PCI-E insert slot.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 4 is a drawing showing the preferred embodiment of the present invention in use;

FIG. 6 is a drawing showing another preferred embodiment of the present invention in use.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
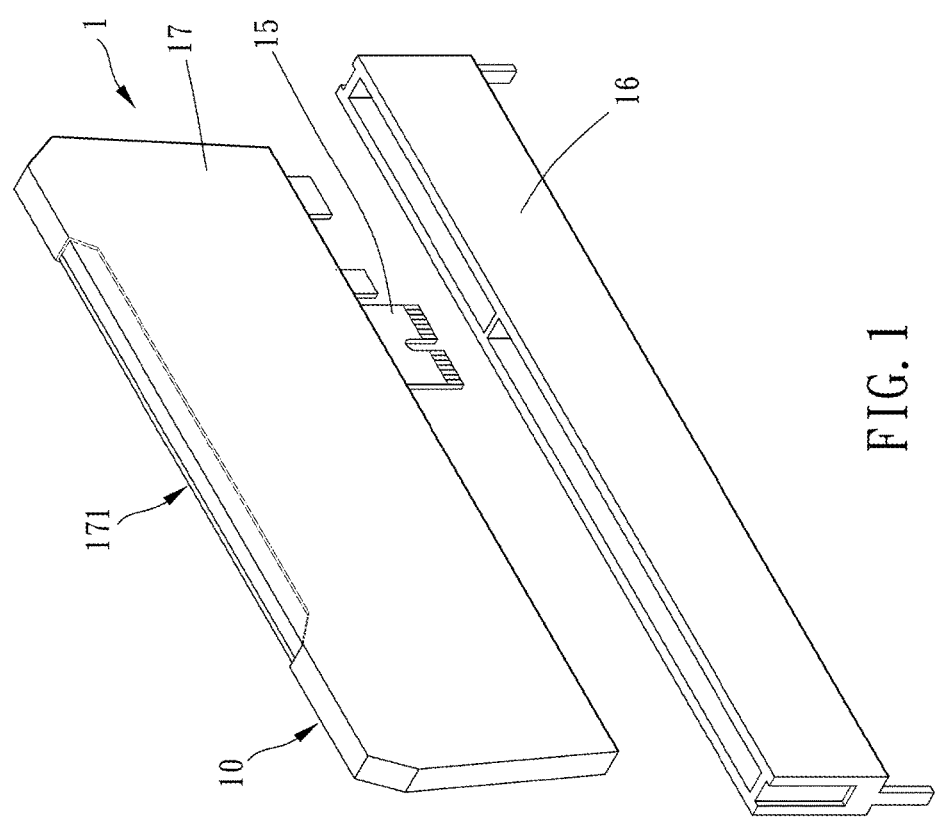
FIG. 1 is a perspective view of a preferred embodiment of the present invention.
Figure 2:
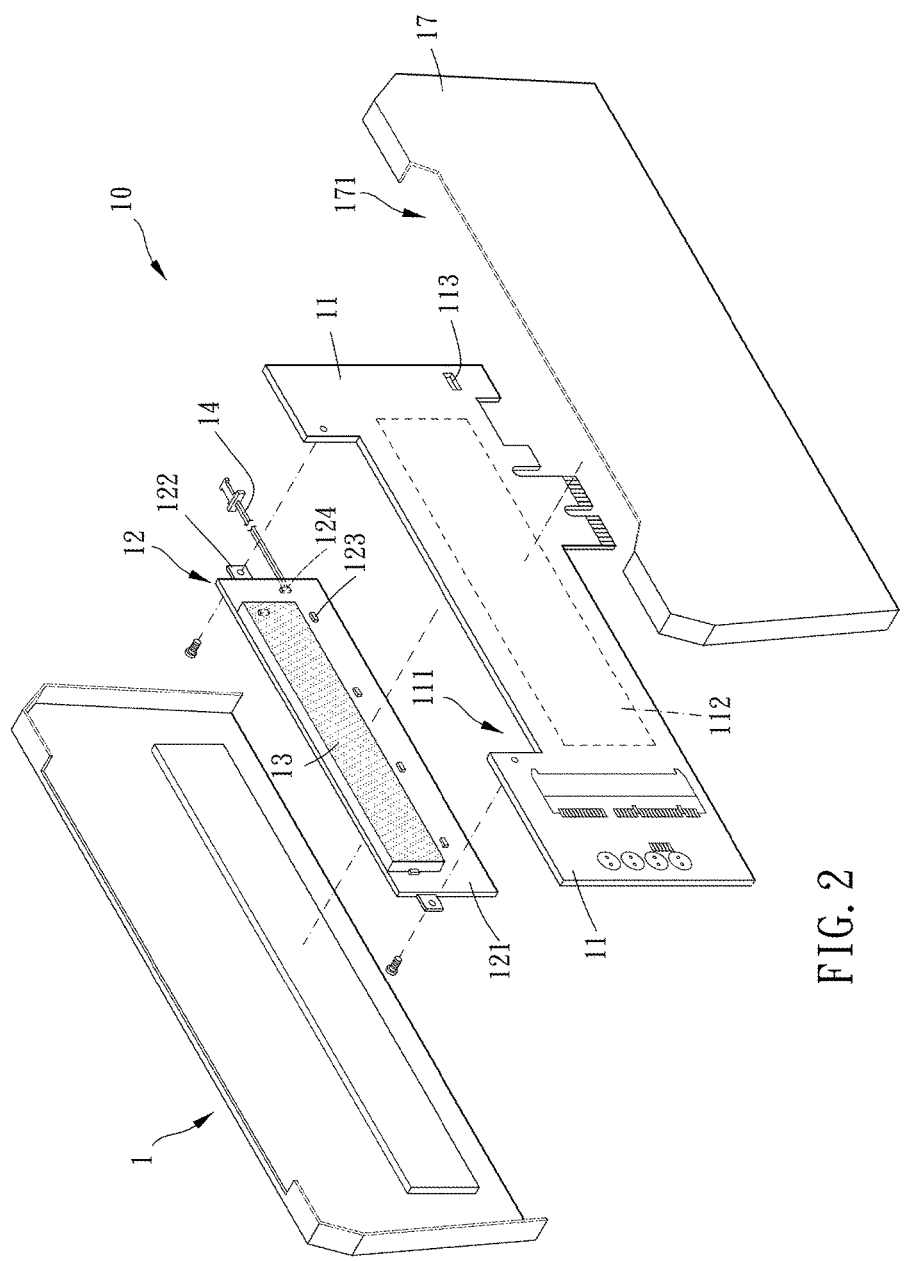
FIG. 2 is a breakdown view of the preferred embodiment of the present invention.
Figure 3:
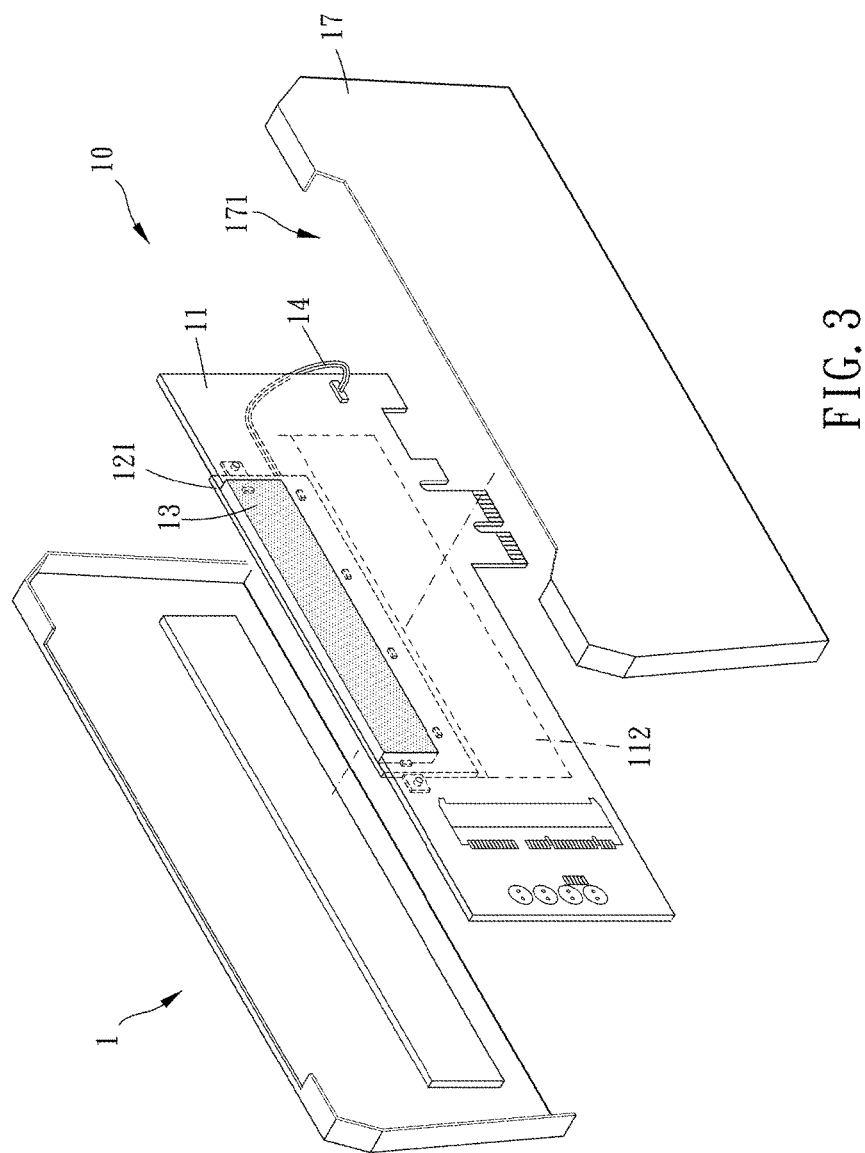
FIG. 3 is another breakdown view of the preferred embodiment of the present invention.
Figure 5:
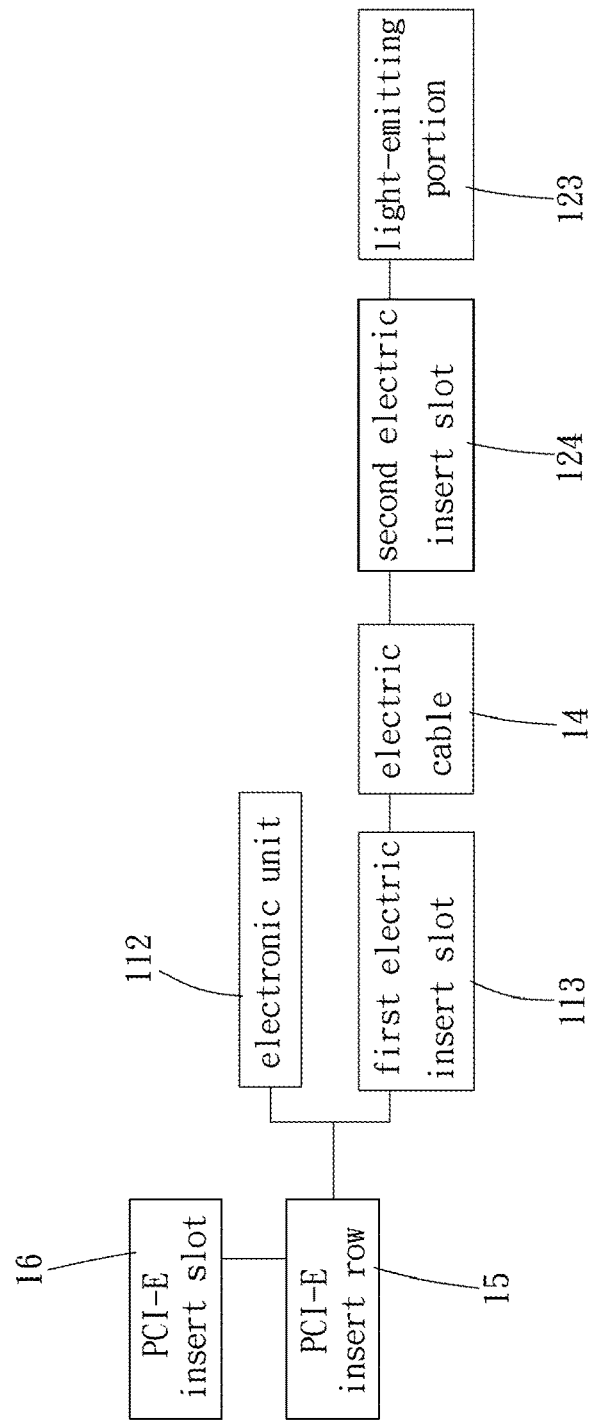
FIG. 5 is a diagram showing an electric relation of the preferred embodiment of the present invention.

Please refer to FIGS. 1 to 5 for a preferred embodiment of the present invention. An electronic device 1 includes a main body 10 and a Peripheral Component Interconnect Express (PCI Express, PCI-E) insert row 15.

The main body 10 has a substrate 11, a light-emitting module 12 and a light-guiding portion 13. The substrate 11 is provided with an electronic unit 112, the electronic unit 112 is electrically connected with the PCI-E insert row 15, and the electronic unit 112 may be a graphic processing module, a display processing module or other processing modules so that the electronic device 1 can serve as a graphics card, a display card or other devices. The light-emitting module 12 has a carrier board 121 and a light-emitting portion 123 which is disposed on the carrier board 121, and the light-guiding portion 13 is arranged corresponding to the light-emitting portion 123.

The PCI-E insert row 15 is disposed on the substrate 11, and the PCI-E insert row 15 is for being electrically connected with a PCI-E insert slot 16. More specifically, the PCI-E insert row 15 can transmit not only power but also data. It is understandable that the PCI-E insert row 15 may be an insert row of PCI-E x1, PCI-E x2, PCI-E x4, PCI-E x8 or PCI-E x16 in accordance with the PCI-E insert slot 16 of different mother boards.

The substrate 11 is formed with a first electric insert slot 113 which is electrically connected with the PCI-E insert row 15, the carrier board 121 is formed with a second electric insert slot 124 which is electrically connected with the light-emitting portion 123, the first electric insert slot 113 and the second electric insert slot 124 are electrically connected with each other through an electric cable 14 being inserted into the first electric insert slot 113 and the second electric insert slot 124, and the substrate 11 and the carrier board 121 are printed circuit boards so as to make the light-emitting portion 123 electrically connectable with the PCI-E insert row 15. In other embodiments, the carrier board and the substrate are not limited to being electrically connected through an insert slot and an electric cable, the carrier board and the substrate may be electrically connected through welding; or, the light-emitting portion and the PCI-E insert row may not be electrically connected, instead, the electric cable is connected to other exterior powers (for example, other insert slots of the mother board).

The main body 10 further includes a shell 17, the shell 17 is covered on two opposite sides of the substrate 11, the shell 17 is formed with a light-penetrable portion 171, and at least a part of light from the light-emitting portion 123 can be projected to outside of the electronic device 1 through the light-guiding portion 13 and the light-penetrable portion 171. The light-penetrable portion 171 may be a layer made of a light-penetrable material or a hollow-out structure (or the light-guiding portion is engagedly disposed on the hollow-out structure), light projected from the light-guiding portion 13 can still be projected to the outside of the electronic device 1. In other embodiments, the shell may not be formed with the light-penetrable portion, and the light-emitting module and the light-guiding portion may be disposed on an outer surface of the shell and have the effect of light-emission and heat-dissipation.

Furthermore, the substrate 11 has a through hole 111, the light-guiding portion 13 is disposed into the through hole 111 (the carrier board may be engagedly disposed into the through hole) so that the light-guiding portion 13 occupies less space and that a volume of the electronic device 1 is decreased. The carrier board 121 is protrusively formed with at least one lateral wing 122, and the at least one lateral wing 122 is connected with the substrate 11. In this embodiment, the carrier board 121 is respectively protrusively formed with one said lateral wing 122 on two opposite ends thereof to make the carrier board 121 be fixed on the substrate 11. It is to be noted that the carrier board 121 and the substrate 11 may be connected with each other through welding, assembling or engagement. Besides, the carrier board may not be connected with the substrate but connected with the shell; or, the light-guiding portion is engagedly disposed on the shell to position the carrier board which is connected with the light-guiding portion.

The light-guiding portion 13 is formed with a scattering structure 131, the part of the light from the light-emitting portion 123 is projected toward the scattering structure 131 and scattered, penetrates through the light-guiding portion 13 evenly, and is projected to the outside of the electronic device 1. When viewed from the outside of the electronic device 1, the light is not concentrated and harsh to the eye.

In this embodiment, the scattering structure 131 is evenly distributed inside the light-guiding portion 13, and the part of the light from the light-emitting portion 123 is scattered through the scattering structure 131 and projected out from a circumferential side of the light-guiding portion 13. Specifically, the scattering structure 131 is composed of a plurality of scattering particles, and a material of the scattering particles is different from a material of the light-guiding portion 13; therefore, when the light is projected on the scattering particles, the light is scattered (reflected) or refracted to make the light be projected out evenly. It is understandable that the light-emitting portion 123 closely contacts the light-guiding portion 13 to make a transmission efficiency of light preferable; or, there is a proper distance between the light-emitting portion 123 and the light-guiding portion 13 to prevent the light-guiding portion 13 from being wore out due to heat of the light-emitting portion 123.

Please refer to FIG. 6 for a light-guiding portion 13a of another embodiment. Compared with the embodiment of FIGS. 1 to 5, the light-guiding portion 13a has at least one incident surface 132a, a scatter surface 133a which is formed with a scattering structure 131a and an emergent surface 134a opposite to the scatter surface 133a, the light-emitting portion 123a is disposed next to the at least one incident surface 132a, light from the light-emitting portion 123a enters toward the at least one incident surface 132a, and a part of the light is scattered through the scattering structure 131a and penetrates through the emergent surface 134a. Specifically, the scattering structure 131a includes a concave-convex structure, and the light from the light-emitting portion 123a enters from two opposite end faces (incident surfaces) of the light-guiding portion 13a so that the light can penetrate through the emergent surface 134a more evenly after being scattered through the concave-convex structure. In other embodiments, the scattering structure may include a scattering dots structure which also allows the light to penetrate more evenly from a specific emergent surface.

Given the above, the light-emitting portion of the electronic device is not disposed on the substrate (the light-emitting portion is disposed on the carrier board), so when the light-emitting portion is damaged, the user only needs to replace the carrier board on which the light-emitting portion is disposed instead of replacing a whole set of electronic device.

In addition, the light-emitting portion is disposed on the carrier board instead of sharing a heat-dissipating area on the substrate with the electronic unit; therefore, a heat-dissipating efficiency is elevated, and a risk of the electronic device being damaged due to overheating is lowered.

Moreover, a scattering structure of the light-guiding portion makes the light projected from the light-emitting portion scatter to the outside of the electronic device more evenly, and the light looks softer.

While we have shown and described various embodiments in accordance with the present invention, it should be clear to those skilled in the art that further embodiments may be made without departing from the scope of the present invention.

What is claimed is:

1. An electronic device, including:
  a main body, having a substrate, a light-emitting module and a light-guiding portion, the substrate being provided with an electronic unit, the light-emitting module having a carrier board and a light-emitting portion disposed on the carrier board, the light-guiding portion is arranged corresponding to the light-emitting portion, at least a part of light from the light-emitting portion being projected to outside of the electronic device through the light-guiding portion; a Peripheral Component Interconnect Express (PCI Express, PCI-E) insert row, disposed on the substrate and electrically connected with the electronic unit;
  wherein the light-emitting module is electrically connectable with the PCI-E insert row or configured to electrically connectable with an exterior power;
  wherein the light-guiding portion is formed with a scattering structure, the part of the light from the light-emitting portion is projected toward the scattering structure and scattered, penetrates through the light-guiding portion evenly, and is projected to the outside of the electronic device.

2. The electronic device of claim 1, wherein the scattering structure is evenly distributed inside the light-guiding portion, and the part of the light from the light-emitting portion is first projected toward the scattering structure and then projected out from a circumferential side of the light-guiding portion.

3. The electronic device of claim 1, wherein the light-guiding portion has at least one incident surface, a scatter surface having the scattering structure and an emergent surface opposite to the scatter surface, the light-emitting portion is disposed next to the at least one incident surface, the part of the light from the light-emitting portion enters toward the at least one incident surface, and the part of the light from the light-emitting portion is scattered through the scattering structure and penetrates through the emergent surface.

4. The electronic device of claim 3, wherein the scattering structure includes a concave-convex structure or a scattering dots structure.

5. An electronic device, including:
a main body, having a substrate, a light-emitting module and a light-guiding portion, the substrate being provided with an electronic unit, the light-emitting module having a carrier board and a light-emitting portion disposed on the carrier board, the light-guiding portion is arranged corresponding to the light-emitting portion, at least a part of light from the light-emitting portion being projected to outside of the electronic device through the light-guiding portion; a Peripheral Component Interconnect Express (PCI Express, PCI-E) insert row, disposed on the substrate and electrically connected with the electronic unit; wherein the substrate has a through hole, and the light-guiding portion is disposed into the through hole;
wherein the light-emitting module is electrically connectable with the PCI-E insert row or configured to electrically connectable with an exterior power.

6. The electronic device of claim 1, wherein the carrier board is protrusively formed with at least one lateral wing, and the at least one lateral wing is connected with the substrate.

7. The electronic device of claim 1, wherein the substrate has a first electric insert slot which is electrically connected with the PCI-E insert row, the carrier board has a second electric insert slot which is electrically connected with the light-emitting portion, and the first and second electric insert slots are electrically connected with each other through an electric cable inserting into the first and second electric insert slots.

8. An electronic device, including:
a main body, having a substrate, a light-emitting module and a light-guiding portion, the substrate being provided with an electronic unit, the light-emitting module having a carrier board and a light-emitting portion disposed on the carrier board, the light-guiding portion is arranged corresponding to the light-emitting portion, at least a part of light from the light-emitting portion being projected to outside of the electronic device through the light-guiding portion;
a Peripheral Component Interconnect Express (PCI Express, PCI-E) insert row, disposed on the substrate and electrically connected with the electronic unit;
wherein the light-emitting module is electrically connectable with the PCI-E insert row or configured to electrically connectable with an exterior power;
wherein the main body further includes a shell, the shell is covered on two opposite sides of the substrate, the shell is formed with a light-penetrable portion, and the at least the part of the light from the light-emitting portion is projectable to the outside of the electronic device through the light-guiding portion and the light-penetrable portion.

9. The electronic device of claim 1, wherein the electronic unit is either a graphic processing module or a display processing module.

* * * * *